Feb. 2, 1971  E. D. HOUGEN  3,559,513
HOLE SAW
Filed May 6, 1968  3 Sheets-Sheet 1
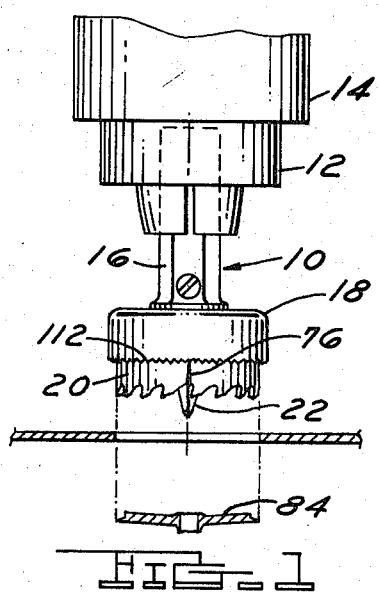
FIG. 1
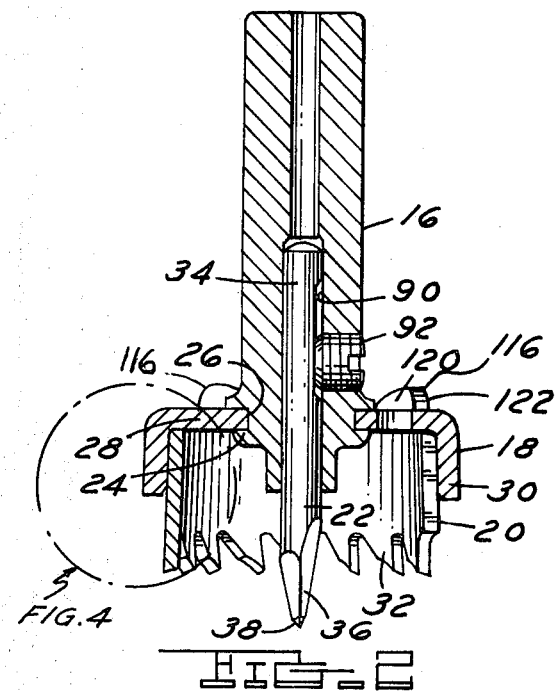
FIG. 4
FIG. 2
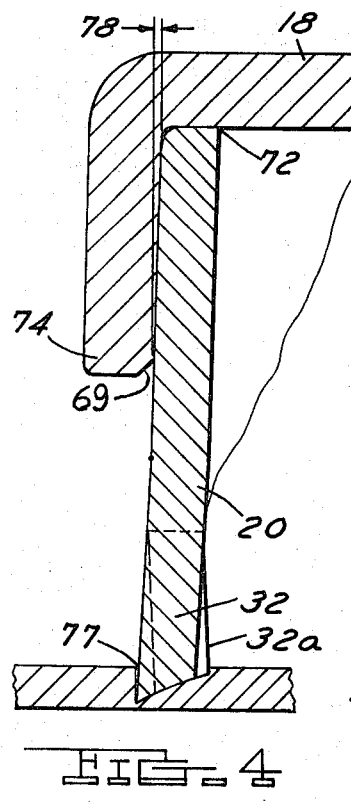
FIG. 4
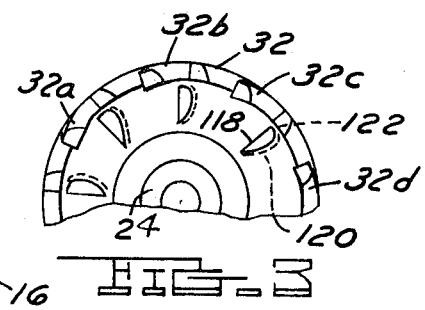
FIG. 3
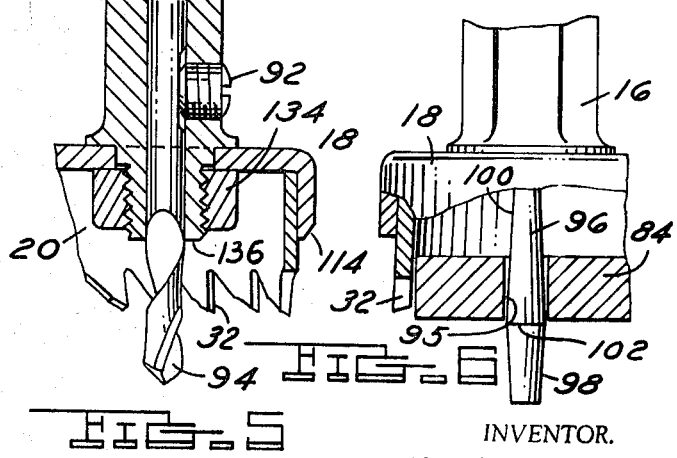
FIG. 5
INVENTOR.
EVERETT D. HOUGEN
BY
Barnes, Kisselle, Raisch & Choate
ATTORNEYS

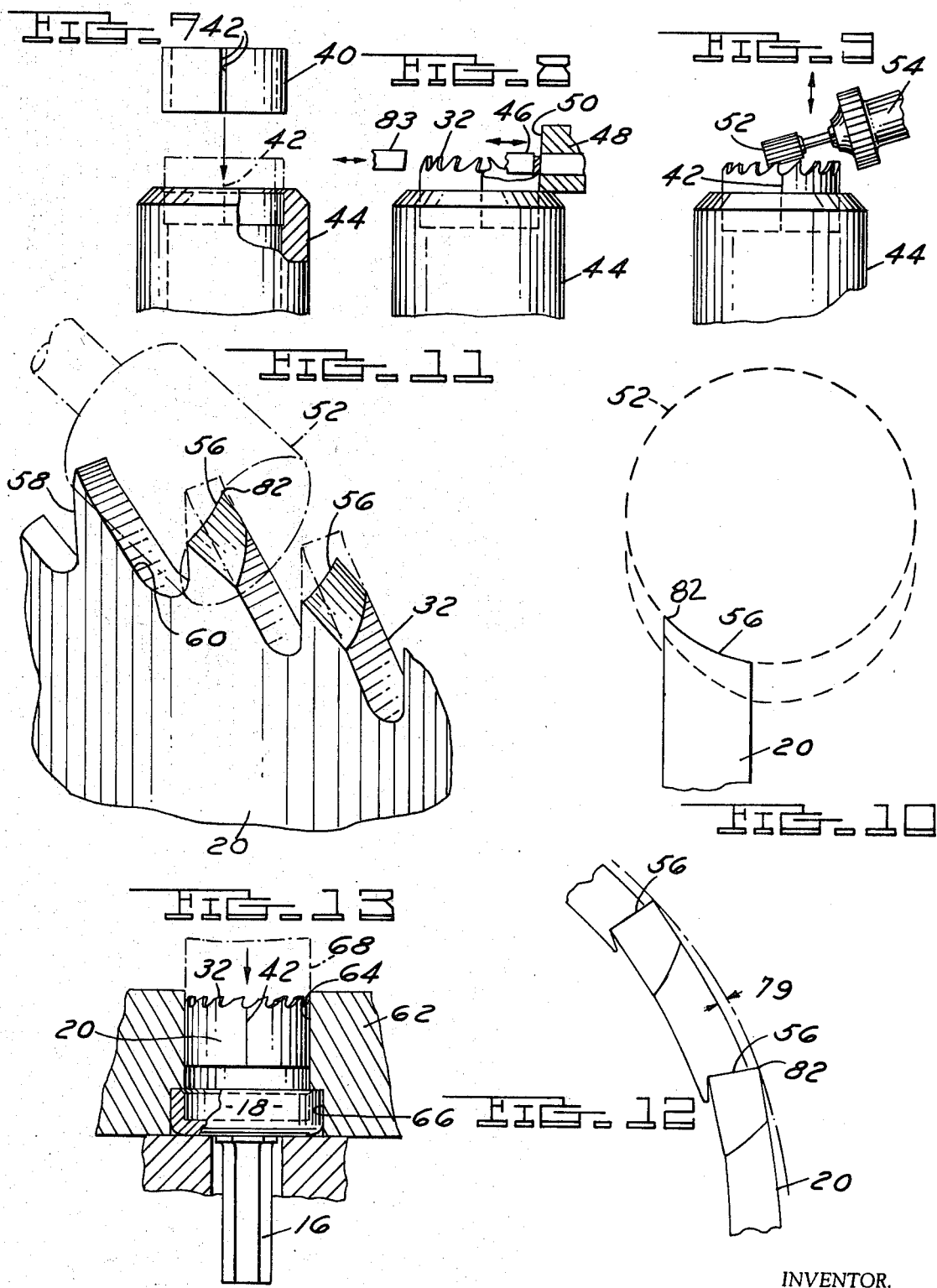

Feb. 2, 1971          E. D. HOUGEN          3,559,513
                        HOLE SAW
Filed May 6, 1968                         3 Sheets-Sheet 3
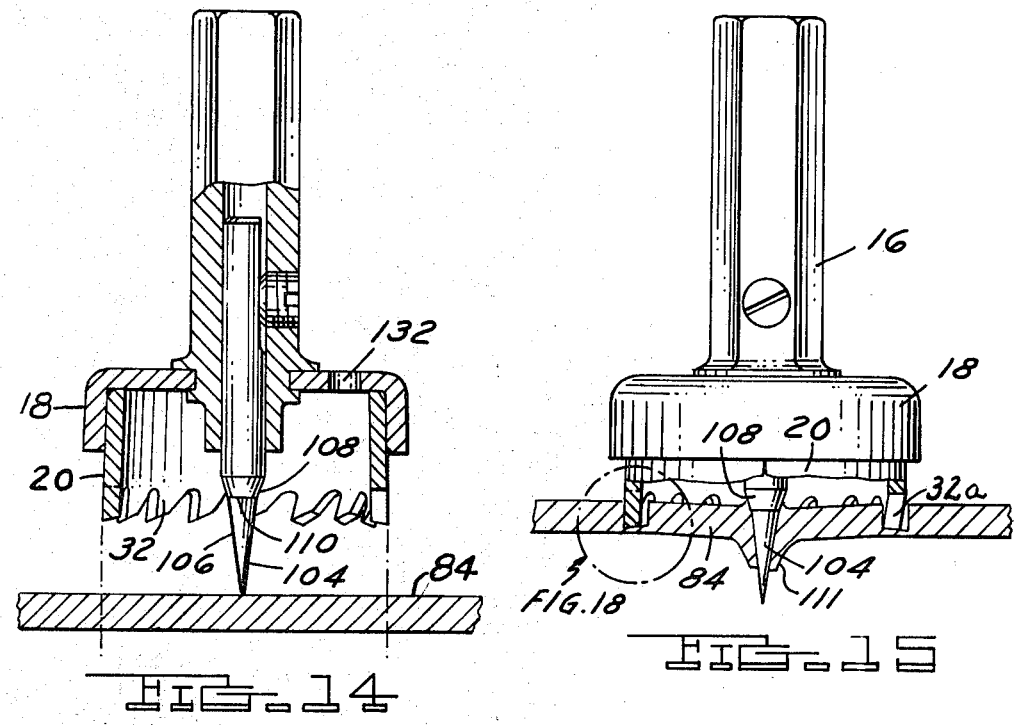
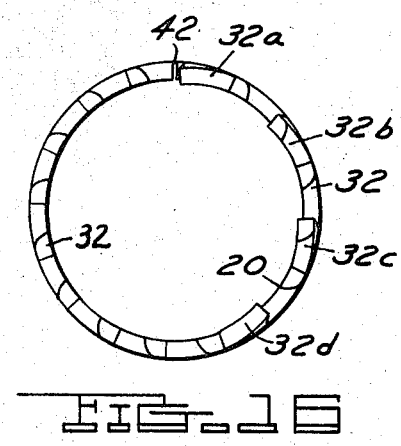
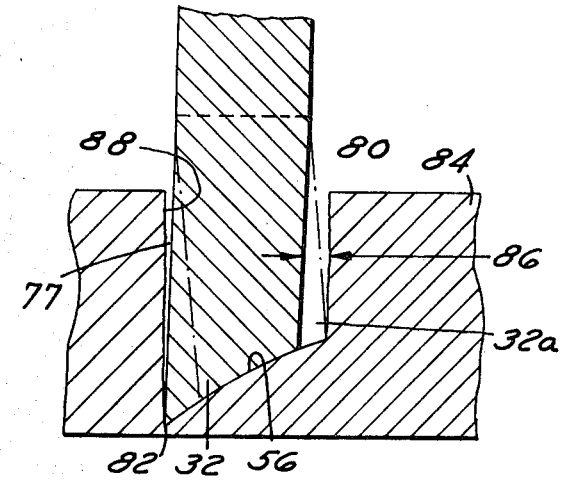
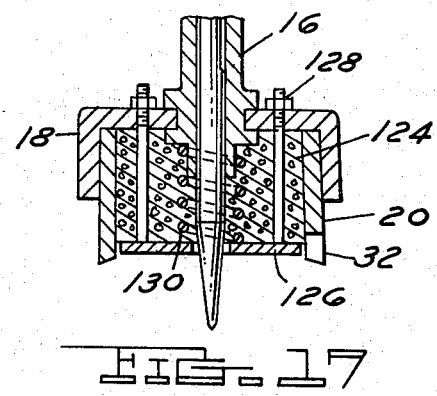
INVENTOR.
EVERETT D. HOUGEN
BY
Barnes, Kisselle, Raisch & Choate
ATTORNEYS

United States Patent Office 3,559,513
Patented Feb. 2, 1971

3,559,513
HOLE SAW
Everett D. Hougen, G–5072 Corunna Road,
Flushing, Mich. 48504
Filed May 6, 1968, Ser. No. 726,855
Int. Cl. B23b *51/04;* B23d *61/00*
U.S. Cl. 77—69                                                15 Claims

ABSTRACT OF THE DISCLOSURE

A hole saw in the form of an arbor having a cup member secured to one end thereof and a circular saw blade press fitted into the cup so that the blade flares outwardly in the direction of its cutting edge. The hole saw also includes a center pilot or drill member which may be a conventional drill, a piercing tool or a tapered pilot member. The teeth on the blade are ground so that the cutting edges are high around the outer periphery and low around the inner periphery of the blade. Selected teeth around less than half of the circumference of the blade are set radially inwardly a slight extent.

---

This invention relates to a tool for cutting holes such as in sheet material and the like, the tool being of the type which includes a circular saw blade.

Hole saws as conventionally constructed are generally very inefficient from the standpoint of cutting a highly accurate circular hole in a minimum of time. Such hole saws (when used in metal, for example) become dull in a relatively short period of time. Furthermore, holes cut by a conventional hole saw in sheet metal are invariably somewhat egg-shaped because the saw has a tendency to skate or skid on the surface of the metal and also because the pilot stem, usually a drill, is incapable of holding the saw concentric to a fixed center point. The teeth of a conventional hole saw become dull in a relatively short time and, as a consequence, the length of time required to cut a hole is excessively long and the life of the hole saw is relatively short.

The hole saw of the present invention is designed to overcome the aforementioned shortcomings of a conventional hole saw. The teeth are ground so that they remain sharp, cut a truly accurate hole about a fixed center and wear for an excessively long time. The hole saw of the present invention is furthermore characterized by its simplicity, rigidity and economy of construction.

In general the hole saw of the present invention comprises an arbor on which is secured a cup member formed of a mild steel. A circular blade is press fitted into the cup, the blade and cup being dimensioned such that upon press fitting the blade into the cup, the free edge of the cup yields slightly and the blade, therefore, flares outwardly in the direction of its cutting edge. The teeth of the blade are first notched and then ground so that the cutting edges are high on the outer periphery and low on the inner periphery of the blade. Where the cutter is used for cutting sheet material, such as sheet steel or steel plate which is relatively thick, it is preferably provided with some means for delivering lubricant to the cutting edges of the blade. These means may be in the form of a lubricant absorbing sponge within the cup member or a series of vanes formed on the cup member and shaped to direct cutting fluid to the teeth.

Other features and objects of the present invention will become apparent from the following description and the accompanying drawings in which:

FIG. 1 is an elevational view showing one form of hole saw of this invention mounted in the chuck of a drill and also illustrating the form of hole and slug cut by the tool.

FIG. 2 is a sectional view of a hole saw in accordance with the present invention.

FIG. 3 is a fragmentary plan view of a portion of the hole saw.

FIG. 4 is a sectional view on an enlarged scale of the portion of the hole saw shown in FIG. 2 and designated 4, illustrating the manner in which the blade cuts through a sheet of material.

FIG. 5 is a fragmentary view, partly in section, showing a modification of the hole saw.

FIG. 6 is a view similar to FIG. 5 showing another modification of the hole saw.

FIG. 7 is a generally schematic view showing the manner in which the blade is mounted in a fixture for processing.

FIG. 8 is a schematic view showing the manner in which the teeth are notched in the blade and the manner in which certain of the teeth are set radially inwardly.

FIG. 9 is a schematic view showing the manner in which the cutting edges of the teeth are ground.

FIG. 10 is a fragmentary end view and FIG. 11 is a fragmentary perspective view illustrating the manner in which the cutting edges of the teeth are ground.

FIG. 12 is a fragmentary plan view of the blade showing the tooth configuration after grinding.

FIG. 13 is a sectional view showing the manner in which the finished blade is inserted within the cup-shaped holder.

FIG. 14 is an elevational view, partly in section, of another modification of hole saw according to this invention.

FIG. 15 illustrates the manner in which the hole saw illustrated in FIG. 14 cuts through a sheet of metal.

FIG. 16 is an end view of the blade removed from the tool and illustrating the tooth arrangement.

FIG. 17 is a sectional view of a further modified form of hole saw according to the invention.

FIG. 18 is a fragmentary view on an enlarged scale showing the manner in which the teeth of the blade penetrate through a sheet of material.

In FIG. 1 the hole saw of the present invention is generally designated 10 and is shown mounted within the jaws of a chuck 12 of a drill 14. Drill 14 may be either a drill press or a hand-held drill. Hole saw 10 comprises an arbor 16 on which a retainer in the form of an inverted cup 18 is mounted. The blade of the hole saw is designated 20. In the arrangement illustrated in FIG. 1, the hole saw also includes a piercing tool 22 supported at the center of the hole saw.

Arbor 16 is preferably of hexagonal shape and has a reduced portion which is coined as at 24 around a hexagonal opening 26 (FIG. 2) in the end or bottom wall 28 of cup 18. Blade 20 is in the form of a strip of high speed steel rolled into cylindrical shape and press fitted within the side wall 30 of cup 18. Around its lower edge blade 20 is fashioned with a plurality of cutting teeth 32 formed in a manner hereinafter described.

As is conventional with most hole saws, the hole saw of the present invention has a center pilot or drill member. In the arrangement illustrated in FIGS. 1 and 2 the drill member, designated 22, is in the form of a length of drill rod 34 of high speed steel which is ground at its leading end as indicated at 36 so that the extreme end 38 forms a piercing point adapted to pierce a hole in the material being drilled, such as steel, plastic, etc. The details of the piercing tool are disclosed in my copending application, Ser. No. 726,856, entitled "Piercing Tool for Sheet Material" and filed concurrently herewith.

Referring now to FIGS. 8 through 12 wherein the various steps involved in forming the teeth 32 on the blade 20 are illustrated, the blade is initially in the form of strip of high speed steel rolled into a cylinder 40, the parting edges of which are designated 42 in FIG. 7. Cylinder 40 is press fitted into a bushing 44 so that the parting edges 42 are in close abutting engagement. Thereafter teeth 32 are notched in the edge of the blade in the manner illustrated in FIG. 8. The notching operation involves the use of a suitable punch 46 and die 48 shaped to produce the desired tooth formation.

As illustrated in FIG. 8, teeth 32 are formed by notching cylinder 40 in a radially outward direction. That is, punch 46 is caused to travel radially outwardly of cylinder 40 in order to form the teeth. Die 48 has a supporting face 50 which is slightly inclined radially outwardly in a direction toward the free ends of teeth 32 so that in the process of notching out the material between the teeth the metal around the free edge of the blade and consequently the teeth are flared outwardly to a slight extent.

After the teeth are notched the cutting edges thereon are ground. This operation is illustrated in FIGS. 9, 10 and 11. The desired configuration of the cutting edges of the teeth are imparted thereto by means of a grinding wheel or carbide burr 52 mounted in a rotary drive member 54. The arbor of grinding wheel 52 and likewise the cylindrical surface of the grinding wheel are inclined to the horizontal when the teeth are ground. The angle of inclination is preferably in the neighborhood of about 15°. The grinding wheel 52 has a diameter substantially greater than the width of blade 20 (FIG. 10) and the center of rotation of wheel 52 is offset toward the inside of the blade so that the teeth are ground down a greater extent around their inner periphery than around their outer periphery. Referring specifically to FIG. 10, grinding wheel or burr 52 is inclined to the horizontal and offset from the teeth so that the leading end of each tooth is defined by a cutting edge 56 which slopes downwardly and radially inwardly of the hole saw. The inclination of cutting edge 56 can vary considerably depending upon the material to be cut. Preferably this radial inclination lies between 30° to 45° to the horizontal but in any event the cutting edge 56 is high on the outside of the tooth and low on the inside of the tooth. The teeth as originally notched are more or less of conventional shape with a slight rake 58 at their leading faces and a backside 60 which slopes at an angle of about 45°.

After the teeth are notched and ground, the blade is removed from the bushing and press fitted into cup 18 by utilizing another fixture designated 62 in FIG. 13. Fixture 62 has a bore 64 which generally corresponds to the outer diameter of the blade when the parting edges 42 are in abutting relation. Fixture 62 is counter-bored as at 66 to receive the cup 18 of the tool. A pressing member 68 is utilized for pressing blade 20 into cup 18. Cup 18 is preferably formed of a mild cold rolled steel. The cup is also preferably cyanide hardened and plated with cadmium or zinc. The inner diameter of the cup 18 is held to a close dimension as is the length of blade 20 so that after the blade is rolled into cylindrical shape and press fitted into the cup it has a very tight fit therein. The outer diameter of the blade with the parting edges 42 in abutting relation is preferably about .003" to .005" larger than the inner diameter of the cup. The press fit is facilitated by the bevelled edge 69 on the cup (FIG. 4).

Blade 20 is sheared from strip stock. Normally in the process of shearing strip steel the edge of the strip stock initially engaged by the cutting blade is rolled slightly whereas the opposite edge of the strip stock is very sharp and provided with a slight burr. In rolling the strip stock into cylindrical shape to form the blade care should be exercised so that the blunt or rounded edge of the strip is located around the outer periphery of the blade. This round edge is shown somewhat exaggerated at 70 in FIG. 4. If the sharp edge 72 is located around the outer periphery of the blade, it tends to shear or skive the inner periphery of the cup when it is press fitted therein.

Experience has shown that when cup 18 is formed of a mild steel and blade 20 press fitted therein as described, there is a tendency for the free edge of the cup to yield and expand slightly since this free edge, designated 74 in FIG. 4, is weaker than the inner end of the cup. As a result blade 20 flares outwardly slightly around its free edge so that even though the blade is press fitted into the cup with a very tight fit adjacent the teeth the parting edges 42 define a narrow tapered gap 76 (FIG. 1). The amount of outward flare will, of course, vary with the fit between the cup and the blade, the depth or length of side wall 30, the diameter of the cup and the height of the blade. For example, with a cup formed of mild steel having a depth of ¼" and a diameter of about 1" the cup flares outwardly at an angle of about 5° when the blade diameter is .003" to .005" oversize relative to the cup. The outward flare on the blade resulting from the yielding action of the free edge of the cup and also the outward flare on the individual teeth resulting from the fact that they are notched in a radially outward direction cooperate to provide a natural relief around the outer periphery of the teeth. This eliminates any necessity for setting the teeth outwardly to obtain relief. The relief between the teeth and the groove cut by reason of this outward flare is designated 77 in FIGS. 4 and 18; the flare in the cup is designated 78 (FIG. 4); and the outward flare in the teeth is designated 79 (FIG. 12.)

While the blade of the present invention does not require any radial outward set, I have determined that a radial inward set on selected teeth improves the performance of the hole saw remarkably. Referring to FIG. 16, the preferred arrangement of inwardly set teeth is illustrated. Generally speaking, it is desirable to set teeth inwardly around less than half the circumference of the blade. It is also preferred that the inwardly set teeth be other than successive teeth. Excellent results have been obtained when every other tooth around almost half the circumference of the blade are set inwardly. For example, in the arrangement illustrated in FIG. 16 teeth 32a, 32b, 32c and 32d are set inwardly about .020" to .025". This inward set of selected teeth around less than half the circumference of the blade has several distinct advantages. In the first place, since some of the teeth are set inwardly while the remaining teeth flare outwardly slightly, the groove 80 (FIG. 18) cut by the blade is substantially wider than the thickness of the blade thereby providing substantial clearance between the teeth and the groove for the discharge of chips. Since the inwardly set teeth extend around less than half of the circumference of the blade, there is no binding effect between the blade and the slug of metal cut by the blade as the teeth break through the metal. Thus, as the high points 82 of the cutting edges 56 break through the metal, the slug 84 drops freely from within the blade. Furthermore, as compared with conventional hole saws wherein every other tooth is set inwardly or outwardly, in the hole saw of the present invention there are a greater number of teeth doing most of the cutting because the inwardly set teeth amount to not more than 25% of the teeth on the blade. Therefore the teeth which are not set inwardly are capable of withstanding more wear than in a conventional blade. In this connection it will be observed that the majority of the cutting action of the fewer inwardly set teeth is directed merely to enlargement of the groove 80 around the inner periphery thereof as is indicated at 86 in FIG. 18. Accordingly, the wear on all the teeth is somewhat balanced so that neither set is subjected to excessive wear. The operation of setting some of the teeth inwardly is performed after notching and before grinding the teeth. The tooth setting tool is illustrated schematically at 83 in FIG. 8.

Experience has also shown that the hole saw of the present invention cuts a much truer hole than conventional hole saws and is capable of cutting substantially more holes before it becomes dull than a conventional hole saw. This results at least in part from the configuration of the cutting edge 56 on the teeth; namely, the inclination of the cutting edge so that it is high on the outside and low on the inside. In a conventional hole saw where the cutting edges are substantially flat or parallel with the plane of the material being cut, there is a tendency for the blade to skid or skate on the surface of the material being cut. This not only produces a hole substantially larger than the hole saw and also of non-circular shape but also produces considerable wear on the teeth. With the hole saw of the present invention when the teeth are brought into contact with the work, the initial contact is between the high ends 82 and the surface of the work being cut. With a moderate amount of pressure these high points 82 on at least 75% of the teeth around the blade initiate cutting of a shallow narrow groove which is accurately concentric to the axis of rotation of the saw. As soon as these high points 82 penetrate into the work a relatively small depth, a fixed accurate track is formed in the workpiece for guiding the continued downward movement of the hole saw through the work. As a result, a highly accurate hole is formed in the workpiece. Furthermore, as the high points 82 of the teeth penetrate through the lower face of the work the slug is immediately severed from the work and the blade does not tend to twist or stick in the work. Furthermore, since the slug is immediately severed from the work as soon as the high points 82 penetrate through the work, the hole 88 is not only accurately formed but does not have the objectionable burr around the underside of the workpiece.

Numerous modifications can be incorporated in a hole saw of the type described. For example, in the arrangement shown in FIGS. 1 and 2 the center pilot is in the form of a piercing tool 22 which is retained in a socket 90 in arbor 16 by a set screw 92. In the arrangement illustrated in FIG. 5 a center drill 94 is employed instead of a piercing tool 22. The use of a piercing tool such as shown at 22 is desirable when the material being cut is sheet steel of not more than 18 gauge thickness. When steel of greater thickness is employed, it is desirable to use a drill such as shown at 94. In some instances it may even be more desirable to predrill a center pilot hole 95 and then utilize a pilot such as indicated at 96 in FIG. 6. Pilot 96 is tapered radially inwardly as at 98 adjacent its lower end and is provided with a reverse taper 100 adjacent its upper end. The line around the pilot designated 102 where the taper reverses has a diameter corresponding to the pre-drilled hole 95 and is spaced just below the lower ends of teeth 32 so that when the teeth penetrate through the material there will be no binding of the slug 84 on the pilot.

In the case of a piercing tool generally of the type shown at 22 a further modification thereof for enhancing slug removal is illustrated in FIGS. 14 and 15. In this arrangement the piercing tool, generally designated 104, has its lower end tapered at a slight angle as indicated at 106 and its upper end tapered at a greater angle to the axis of the tool as indicated at 108. The line of demarcation of these two tapers, designated 110, lies preferably just below the root of teeth 32 so that the inclined faces defined by the taper 108 will have a tendency to push the slug 84 outwardly of the blade as the teeth penetrate through the work. The use of a tapered piercing tool such as shown in FIGS. 1, 2, 14 and 15 when cutting holes in sheet metal is extremely desirable since the hole formed by the tool is enlarged progressively and a reinforcing flange 111 is extruded around the lower edge of the pilot hole. This provides an extremely accurate pilot action for the cutter and results in the cutting of a truly circular hole by the hole saw, as explained more fully in said aforementioned copending application.

A further modification of the hole saw involves the formation of a serrated edge 112 (FIG. 1) around the lower edge of cup 18. The provision of the serrated edge is desirable where holes are formed in painted panels, for example, and where a clean metal surface for electrical contact is desired around the edge of the hole. The serrated edge 112 will scrape the paint from around the edge of the hole drilled to expose bare metal. On the other hand, where holes are being cut in painted panels and it is desired to avoid marring of the surface of the panel the lower edge of the cup 18 is tapered as at 114 (FIG. 5) so that a minimum of contact between the cup and the panel results. It will be observed that in any event the lower edge of the cup acts as a shoulder to prevent the cutter from dropping through the hole cut.

In some applications even with the hole saw of the present invention it may be desirable or necessary to apply a lubricant to the teeth of the blade during cutting. One arrangement for supplying lubricant, cutting oil for example, to the teeth is illustrated in FIGS. 2 and 3. In this arrangement the bottom or end wall 28 of cup 18 is fashioned with a plurality of vanes 116 which extend outwardly of the cup in a generally radial direction around shank 16. Each vane 116 defines an opening 118 in the bottom wall 28 of the cup and is of arcuate shape so as to provide a radially extending wall portion 120 and an outer circumferentially extending wall portion 122. As will be observed in FIGS. 2 and 3, the wall of each vane 116 is on the trailing side of its associated opening 118 in relation to the direction of rotation of the hole saw. With this arrangement, as cutting oil is directed to the shank 16 or to the bottom wall 28 of the hole saw, this oil is picked up by vanes 116 and directed into the hole saw where as a result of centrifugal force the cutting oil is directed down to the blade of the cutting teeth. The arrangement shown in FIGS. 2 and 3 is especially adapted for use with drill presses.

Another form of lubricant means for the hole saw is illustrated in FIG. 16. In this arrangement a porous resilient material such as a sponge 124 is arranged within blade 20 and is retained therein by means of a steel plate 126 supported for vertical movement within the blade by a pair of threaded rods 128. Rods 128 are adjusted so that plate 126 lies just above the lower ends of teeth 32. A spring 130 may be employed for biasing plate 126 downwardly in the event that the sponge material 124 is not adequate for this purpose. The arrangement shown in FIG. 17 is admirably suited for use in a hand-held drill. Prior to cutting the hole, the blade and cup of the hole saw are dipped into a cutting oil to enable sponge 124 to become saturated. Thereafter, when the hole saw penetrates through the work being cut plate 126 is caused to rise thereby compressing sponge 124 and continually discharging oil which by reason of centrifugal force is directed to the cutting teeth on the blade.

The hole designated 132 in FIG. 14 is a knockout hole which may be provided for the purpose of knocking a cut slug out of the hole saw in the event it should become wedged therein.

Thus it will be seen that the hole saw of the present invention incorporates numerous advantages over hole saws of conventional construction. The hole saw is of very economical construction, embodying merely a shank 16, a cup 18, a blade 20 and some form of pilot member such as a drill, piercer, etc. The cup member may be staked on the shank as shown in FIGS. 1 and 2; or, if desired, it may be retained on the shank by means of a nut 134 threaded on the shank extension 136 within the cup as shown in FIG. 5. When the blade becomes dull it is not necessary to replace the cup. Since the parting ends 42 of the blade are not welded together, the blade may be broken out of the cup by gripping it with a pliers or other gripping tool adjacent one of the parting ends of the blade and bending it inwardly. Thereafter a new blade may be pressed into the cup. The fact that the parting ends 42 are merely in abutting relation, as distinguished from being welded together, is desirable not only from the standpoint of economy of manufacture but also from the standpoint of enabling the blade to flare outwardly when it is press fitted into the undersized cup. As pointed out previously, the configuration of the cutting edges 56 of the teeth results in longer wear, more accurate cutting and free discharge of slug. Likewise, the inward set of a few selected teeth around less than half of the circumference of the blade enhances the wear properties of the blade as a whole, provides desirable chip clearance between the work being cut and eliminates to a very large extent the possibility of the slug becoming wedged within the blade as the teeth penetrate through the work.

I claim:

1. A hole saw comprising an arbor, a blade holder in the form of an inverted cup mounted on the arbor and a strip steel blade rolled into cylindrical shape and having teeth extending circumferentially around one edge thereof, said cylindrical blade being press fitted into the open end of the cup and frictionally retained therein by said press fit, a pilot member mounted at the axis of rotation of the arbor and projecting from within the cup outwardly beyond the teeth on the blade, said pilot member comprising a stud of circular cross section having a maximum diameter at a level adjacent the apices of the teeth, the portions of the pilot member on opposite sides of said portion of maximum diameter tapering inwardly toward the axis of the pilot member so that the diameter of the pilot member is progressively smaller at successive sections spaced from and on opposite sides of the section of maximum diameter.

2. A hole saw comprising an arbor, a blade holder in the form of an inverted cup mounted on the arbor and a strip steel blade rolled into cylindrical shape and having teeth extending circumferentially around one edge thereof, said cylindrical blade being press fitted into the open end of the cup and frictionally retained therein by said press fit, the successive teeth around more than half of the circumference of the blade lying in a path concentric to the axis of the arbor, at least some of said teeth around the remaining portion of the circumference of the blade being offset inwardly, the apices of all of said teeth being shaped to present cutting edges to a workpiece which slope radially and axially inwardly at substantially the same angle.

3. A hole saw as called for in claim 2 wherein the teeth which are not offset inwardly flare radially outwardly in the direction of their apices.

4. A hole saw having a blade comprising a cylindrical wall provided with cutting teeth extending around the entire periphery at one end thereof, said teeth being diametically divided into two groups, at least some of the teeth in only one of said groups being offset inwardly with respect to all of the teeth in the other group, all of the inwardly offset teeth being concentric to the longitudinal central axis of the blade.

5. A hole saw as called for in claim 4 wherein the number of said inwardly offset teeth comprise approximately 25% of the teeth.

6. A hole saw as called for in claim 4 wherein the adjacent teeth in each pair of inwardly offset teeth are separated by at least one tooth which is not inwardly offset.

7. A hole saw as called for in claim 4 wherein all of the teeth in said two groups have cutting edges at the apices which are inclined radially and axially inwardly of the cylindrical blade.

8. A hole saw as called for in claim 7 wherein all of said cutting edges are inclined radially and axially at substantially the same angle.

9. A hole saw comprising an arbor, a blade holder in the form of an inverted cup formed of mild steel mounted on one end of the arbor, a blade of strip tool steel rolled into cylindrical shape and press fitted into said cup, said blade having cutting teeth extending around the free end thereof, said blade flaring outwardly throughout its axial extent in the direction of its free end.

10. A hole saw as called for in claim 9 wherein said blade flares outwardly at an angle of about 5°.

11. A hole saw as called for in claim 9 wherein the side wall of the cup is correspondingly flared outwardly in the direction toward its open end.

12. A hole saw comprising an arbor, a blade holder in the form of an inverted cup mounted on the arbor and having a generally cylindrical side wall of substantially uniform thickness which terminates at the open end of the cup in a plane perpendicular to the axis of the arbor, a strip steel blade rolled into circular cylindrical shape and secured in said cup with the outer cylindrical surface thereof engaging the inner cylindrical surface of the side wall throughout substantially the entire axial extent of the cup side wall, the free edge of the cup side wall defining a shoulder which projects radially outwardly from the outer cylindrical surface of the blade around the entire periphery thereof, said blade extending axially beyond said shoulder and having cutting teeth extending around the free end thereof.

13. A hole saw as called for in claim 12 wherein said free edge of the cup defining said shoulder is radially serrated.

14. A hole saw having a generally circular cylindrical blade provided with cutting teeth extending around one end thereof, each successive tooth around more than half of the periphery of the blade lying in a path concentric to the central axis of the blade, at least some of the teeth around the remaining portion of the periphery of the blade being offset inwardly.

15. A hole saw comprising an arbor, a circular cylindrical blade mounted on said arbor coaxial therewith and having cutting teeth extending around the periphery at one end thereof, a pilot member mounted on said arbor coaxially therewith, said arbor extending coaxially through said blade and projecting axially beyond said teeth, said pilot member comprising a stud having a maximum diameter at a level adjacent the apices of the teeth, the portions of the pilot member on opposite sides of said portion of maximum diameter tapering inwardly toward the axis of the pilot member so that the diameter of the pilot member is progressively smaller at successive sections spaced from and at opposite sides of the section of maximum diameter.

References Cited

UNITED STATES PATENTS

| | | | |
|---|---|---|---|
| 2,015,339 | 9/1935 | Ellingham | 143—85X |
| 2,444,099 | 6/1948 | Hennessey | 77—69 |
| 2,588,267 | 3/1952 | McLaughlin | 77—69X |
| 2,598,042 | 5/1952 | Dritz | 77—69X |
| 2,779,361 | 1/1957 | McKiff | 145—120X |
| 3,382,743 | 5/1968 | Trevathan | 77—69 |

FOREIGN PATENTS 3,726    1869    Great Britain.

FRANCIS S. HUSAR, Primary Examiner

U.S. Cl. X.R.

77—68; 76—25, 108; 29—567; 143—85; 145—119